US007817990B2

(12) United States Patent
Pamminger et al.

(10) Patent No.: US 7,817,990 B2
(45) Date of Patent: Oct. 19, 2010

(54) METHOD OF ORDERING LOCATION-SPECIFIC SERVICES

(75) Inventors: Herbert Pamminger, Neukirchen (AT); Dirk Fox, Bischofswiesen (DE); Gregor Ponert, Salzburg (AT); Johannes Lippert, Wolfgang (AT); Gunther Gisenfelder, Grassau (DE)

(73) Assignee: Skidata AG, Groedig/Salzburg (AT)

( * ) Notice: Subject to any disclaimer, the term of this patent is extended or adjusted under 35 U.S.C. 154(b) by 0 days.

(21) Appl. No.: 12/322,559

(22) Filed: Feb. 4, 2009

(65) Prior Publication Data

US 2009/0203367 A1 Aug. 13, 2009

(30) Foreign Application Priority Data

Feb. 8, 2008 (EP) ................................ 08002313

(51) Int. Cl.
*H04L 29/06* (2006.01)

(52) U.S. Cl. .................................................. 455/414.3

(58) Field of Classification Search ............... 455/414.3
See application file for complete search history.

(56) References Cited

U.S. PATENT DOCUMENTS

2009/0203367 A1 * 8/2009 Pamminger et al. ...... 455/414.3

* cited by examiner

*Primary Examiner*—William D Cumming
(74) *Attorney, Agent, or Firm*—Karl F. Milde, Jr.; Eckert Seamans Cherin & Mellott, LLC

(57) ABSTRACT

A method of ordering location-specific services in which RFID or NFC interaction between an RFID or NFC-enabled portable device or a mobile telephone of a user, on the one hand, and a location and service-specific smartposter comprising at least one RFID or NFC label or tag or a location and service-specific RFID or NFC label affixed to an object such as a smartposter, on the other hand, is used to set up an activatable link to the portable device or mobile telephone. A connection to a server operated by the service provider is established following link activation. Location information relating to the RFID or NFC label is communicated to the service provider's server, the contents of the server page corresponding to the link depending on the location information transmitted by the RFID or NFC label. The user is then capable of ordering location-specific services after the connection has been set up.

14 Claims, 3 Drawing Sheets

METHOD OF ORDERING LOCATION-SPECIFIC SERVICES

BACKGROUND OF THE INVENTION

The present invention relates to a method of ordering services specific to a particular location.

It has been known to use RFID ("radio-frequency identification") technology for providing information to mobile communication apparatus such as a mobile telephone. It has been known also to use a non-contacting RFID between a so-called "smartposter" and RFID-enabled apparatus for transferring information to the latter.

Regularly, the technology used in this situation is NFC ("near field communication"), a radio-based technology for short distances using RFID techniques.

As used herein, the term "smartposter" is intended to mean a poster or billboard having an RFID or NFC tag.

SUMMARY OF THE INVENTION

The principal object of the present invention is to provide a method of ordering location-specific services which simplifies and accelerates the order handling process.

Within the meaning of the invention, the ordering of location-specific services may comprise the claiming, booking and payment of such services.

This object, as well as other objects which will become apparent from the discussion that follows, are achieved, according to the present invention, by providing a method of ordering location-specific services in which RFID or NFC interaction between an RFID or NFC-enabled portable device or a mobile telephone of a user, on the one hand, and a location and service-specific smartposter comprising at least one RFID or NFC label or tag or a location and service-specific RFID or NFC label affixed to an object such as a smartposter, on the other hand, is used to set up an activatable link to the portable device or mobile telephone. A connection to a server operated by the service provider is established following link activation. Location information relating to the RFID or NFC label is communicated to the service provider's server, the contents of the server page corresponding to the link depending on the location information transmitted by the RFID or NFC label. The user is then capable of ordering location-specific services after the connection has been set up.

Accordingly, it is proposed, within the inventive method of ordering location-specific services, to set up an activatable link to a user's RFID- or NFC-enabled portable device or mobile telephone by using RFID or NFC interaction between such a portable device or mobile telephone and a location and service-specific smartposter. The smartposter comprises at least one RFID or NFC label or tag. The link is then activated to establish a connection to a server operated by, or associated with, the service provider, with the user being able to place the order, and possibly to pay, for such location-specific services. Alternatively, it is possible also to have at least one location and service-specific RFID or NFC label affixed to an object that is not a smartposter.

In accordance with the invention, the location information of the RFID or NFC label is communicated to the server. The contents of the provider's server page corresponding to the link are dependent on the location information provided by the RFID or NFC label, as detailed in the examples given below.

For a full understanding of the present invention, reference should now be made to the following detailed description of the preferred embodiments of the invention as illustrated in the accompanying drawings.

DESCRIPTION OF THE PREFERRED EMBODIMENTS

Within the meaning of this invention, the portable device may be a notebook or a PDA ("personal digital assistant"), which preferably is capable of GSM communication or has mobile telephone functionality.

In accordance with the invention, activation of the link takes place through a mobile telephone network, a WLAN ("wireless local area network"), a Bluetooth® connection or any other wireless communication technology.

Figure 1:
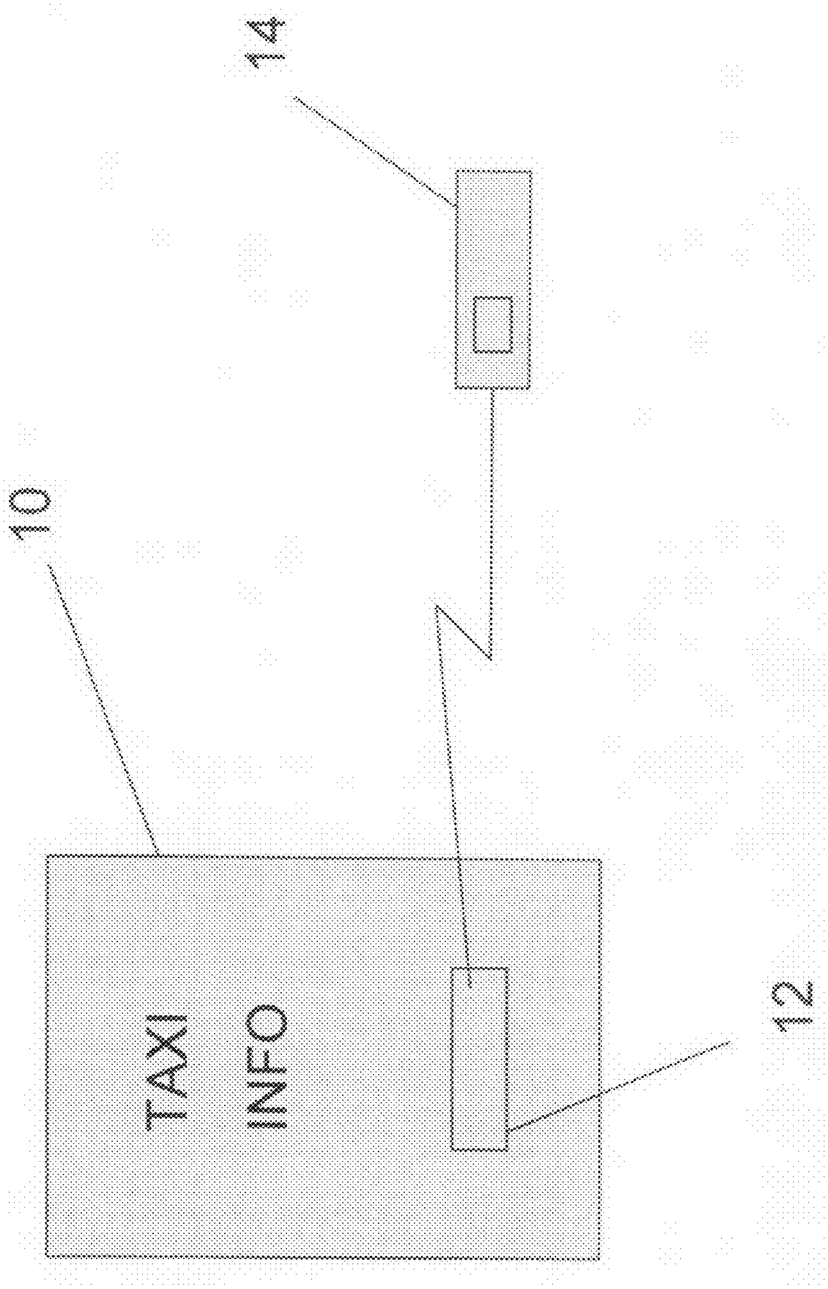
FIG. 1 is a block diagram illustrating a preferred embodiment of the system used in the method according to the present invention.

In accordance with a first embodiment of the invention, and as shown in FIG. 1, a smartposter 10 comprising an RFID or NFC label 12 may be provided at a taxi stand for ordering a taxi, with the link being activated and a connection established to a server in a taxicab service center by means of a portable device 14. Location information is included in the activatable link so that, advantageously, the user does not have to provide such information.

Figure 2:
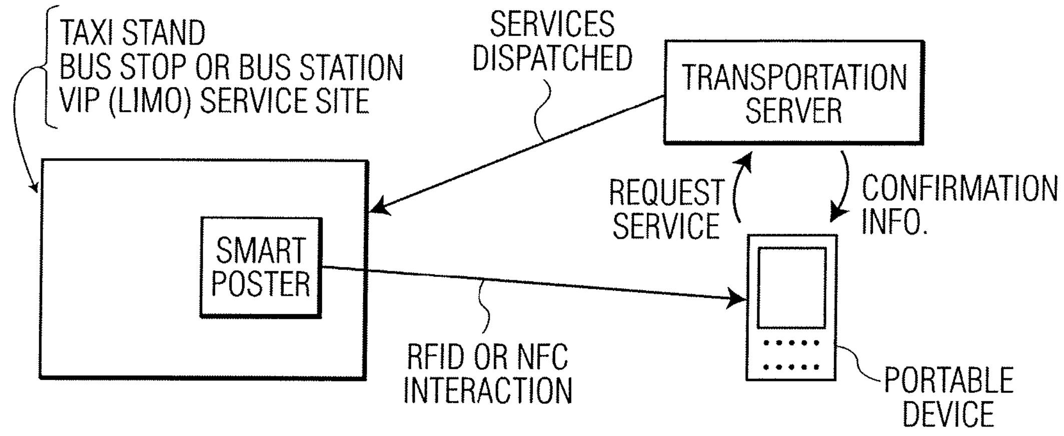
FIG. 2 is a block diagram illustrating the use of the system for transportation services.

In accordance with an advantageous further embodiment of the invention, and as shown in FIG. 2, after a taxi has been ordered the user may be informed of the registration number of the taxi so ordered or its time of arrival. Such information may be communicated by the server to the user's portable device 14 immediately after the order has been placed and through the connection to the portable device by means of a mobile telephone network in the form of an SMS ("short message service") message, for example. In case an SMS message is used, order placement will include communicating the user's telephone number to the server.

In accordance with the invention, and in analogy with procedures relating to the ordering of taxis, it will be possible for a user also to order a shuttle bus or a VIP service (such as a limousine).

Figure 3:
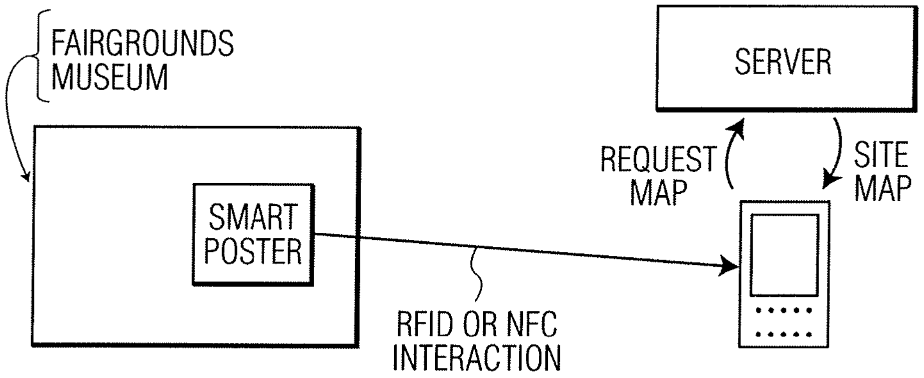
FIG. 3 is a block diagram illustrating one use of the system for a fairgrounds or museum.

In accordance with a variant of the inventive method, and as shown in FIG. 3, the location-specific service may be a fairground or museum guide service, with the smartposter bearing the RFID or NFC label preferably provided on the fairgrounds or inside the museum. In that case, and following link activation and the setting up of the connection to the server associated with the fairground or museum organization, fairground or museum site maps may be downloaded to the portable device or mobile telephone.

Figure 4:
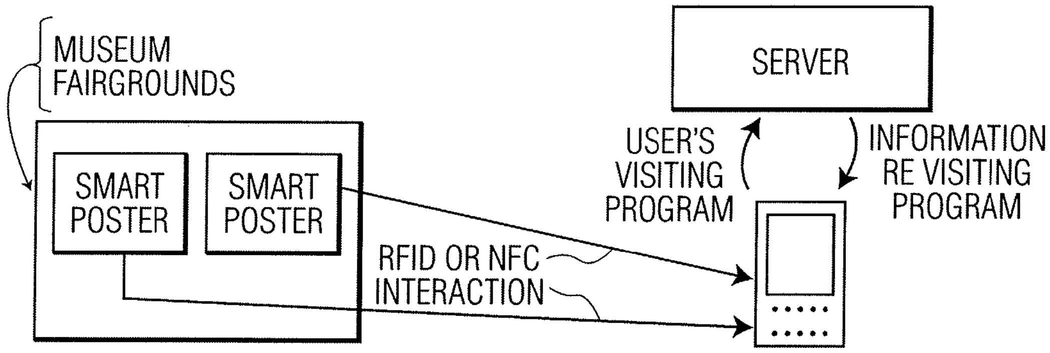
FIG. 4 is a block diagram illustrating another use of the system for a fairgrounds or museum.

In accordance with another further development of the present invention, and as shown in FIG. 4, with an active connection having been established to the server of, or associated with, the fairgrounds, a fair visitor may enter his/her visiting program by ticking off fair stands of interest, for example. In this case, information relating to that program may be downloaded to the user's portable device or mobile telephone. The information may be in the form of site maps and/or stand information conducting the visitor to the fair stands he/she wishes to contact.

Figure 6:
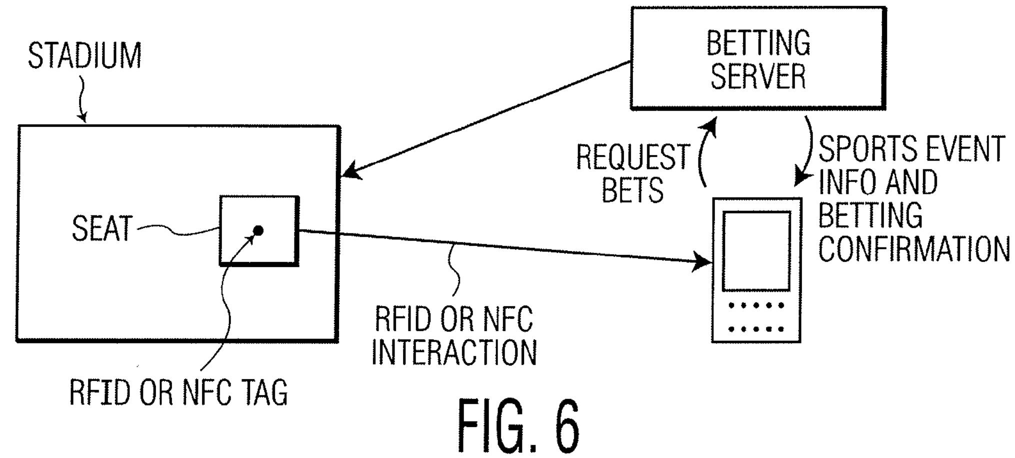
FIG. 6 is a block diagram illustrating another use of the system for a sports stadium.

Within the scope of another further development of the invention, and as shown in FIG. 6, it is contemplated to use the inventive method for the placement of bets at sport events. To this end, RFID or NFC interaction is enabled between the user's portable device or mobile telephone and an RFID or NFC label placed at the user's seat in a stadium or arena and the activatable link transmitted to the portable device or mobile telephone is used to set up a connection to a server of a betting office or bookmaker, with the location information transmitted by the link preferably being evaluated to select and offer bets relating to the sport event or match then taking place. The user may place a corresponding bet, with payment to such betting office or bookmaker being effected via credit card or banking in-formation stored in the portable device or mobile telephone, or directly via the mobile telephone's call number.

Figure 5:
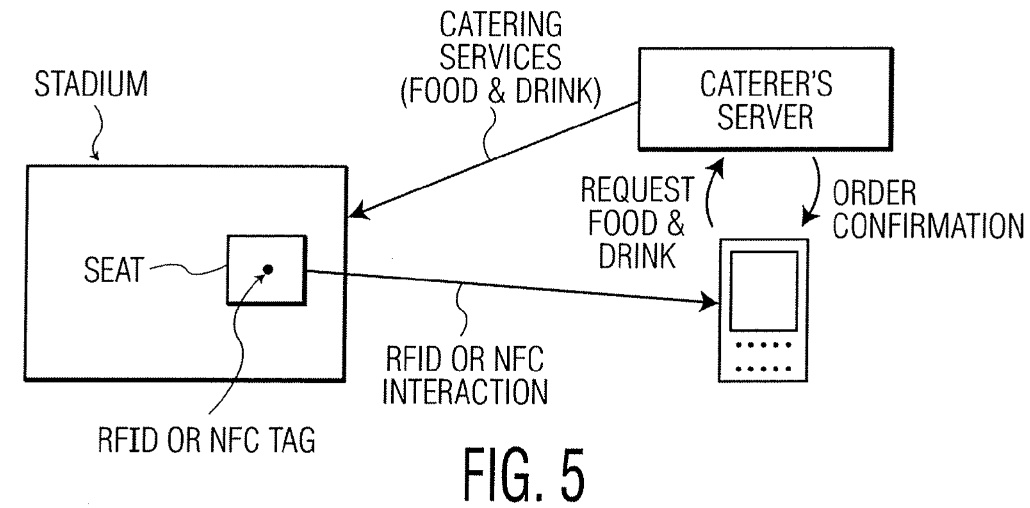
FIG. 5 is a block diagram illustrating the use of the system for a sports statium.

Further, as shown in FIG. 5, it is proposed to enable RFID or NFC interaction between the user's portable device or mobile telephone and an RFID or NFC tag or label located at the user's seat in a stadium or arena and to set up a connection to a server of a caterer via the activatable link transmitted to the portable device or mobile telephone, with the user using this connection to place his/her order directly or to summon a catering assistant to his/her seat.

Advantageously, the activatable link may comprise seat information so that the user does not have to enter corresponding information him/herself. In this situation, each seat may be provided with a label of its own. Alternatively, such labels or tags may be provided on some of the seats only—such as those in a VIP ("very important person") area.

In this context, it may be provided that, after the connection to the caterer's server has been set up, an order for alcoholic beverages is examined to determine whether the age of the person placing the order is legally authorized to do so, such examination relying on data relating to the owner of the ticket of the seat to which the RFID or NFC label is affixed.

Figure 7:
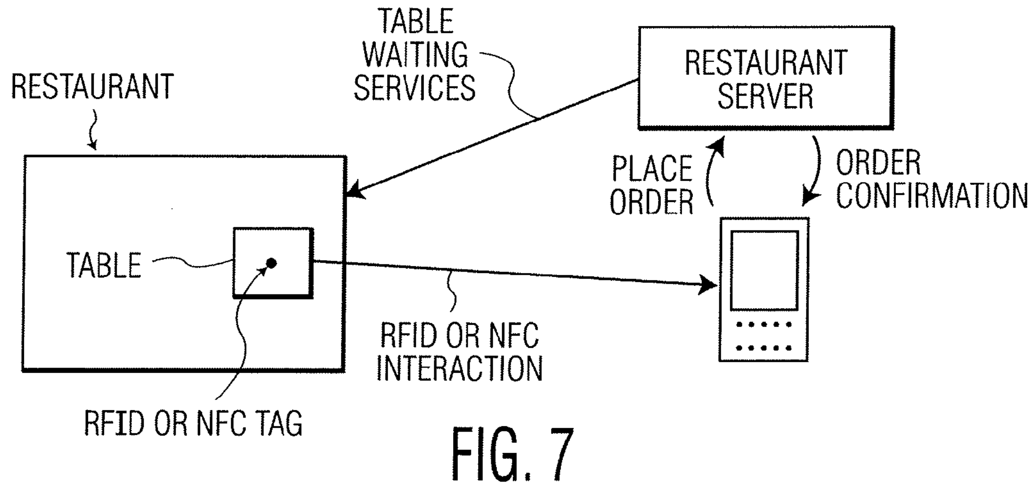
FIG. 7 is a block diagram illustrating the use of the system for restaurant services.

In accordance with the invention, and as shown in FIG. 7, the inventive method may be used for placing orders in a restaurant, with each table or some of the tables being provided with an RFID or NFC label and link activation between the RFID or NFC label and a portable device or a mobile telephone enabling the user to place his/her order, preferably from a menu, or to summon a service assistant, with the activatable link including table information so that no user input is necessary.

If plural location-specific services are available, a separate RFID or NFC label may be provided for each. Alternatively, one single RFID or NFC label may be provided, with the user, following activation of the label-transmitted link, selecting a desired service under menu control.

There has thus been shown and described a novel method for ordering location-specific services which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of ordering location-specific services, comprises the steps of:

(a) transmitting an activatable link to a user's radio-frequency identification (RFID)—or near field communication (NFC)-enabled portable device or mobile telephone by establishing RFID or NFC interaction between said portable device or mobile telephone and a location-specific and service-specific smartposter comprising at least one RFID or NFC label or tag or a location or service specific RFID or NFC label affixed to an object;

(b) following link activation, establishing a connection with a server of the service provider with the location information included in the RFID or NFC label being transmitted to the server and the contents of the server page corresponding to the link depending upon the location information provided by the RFID or NFC label, thereby enabling the user to place orders for location specific services after the connection has been set up.

2. Method of ordering location-specific services according to claim 1, wherein, if plural location-specific services are available, a separate RFID or NFC label or tag is provided for each.

3. Method of ordering location-specific services according to claim 1, wherein, in case plural location-specific services are available, a single RFID or NFC label is provided, with the user enabled to select the desired service on a menu-controlled basis after the link transmitted by the RFID or NFC label has been activated.

4. Method of ordering location-specific services according to claim 1, wherein the location- and service-specific smartposter is affixed to a taxi stand, a shuttle bus stop or a VIP service site, enabling a taxi, a shuttle bus or a very important person (VIP) service to be ordered following link activation and the establishment of a connection to a server of a taxi center, a shuttle bus center or a VIP service, respectively, and wherein, if taxi or a shuttle bus is ordered and following placement of the order, the user is informed of the registration number of the taxi or the shuttle bus so ordered and its time of arrival, with said information being communicated by the server to the user's portable device or mobile telephone immediately after the order has been placed and via the connection between the portable device or the mobile telephone and the server.

5. Method of ordering location-specific services according to claim 1, wherein the location- and service-specific smartposter is affixed to a taxi stand, a shuttle bus stop or a very important person (VIP) service site, enabling a taxi, a shuttle bus or a VIP service to be ordered following link activation and the establishment of a connection to a server of a taxi center, a shuttle bus center or a VIP service, respectively, and wherein, if taxi or a shuttle bus is ordered and following placement of the order, the user is informed of the registration number of the taxi or the shuttle bus so ordered and its time of arrival, with said information being communicated by the server to the user's portable device or mobile telephone, at some time after the order has been placed, by means of a mobile telephone network in the form of an SMS, with the user's telephone number being communicated to the server if the aforesaid SMS communication is used.

6. Method of ordering location-specific services according to claim 1, wherein the location and service specific smartposter is provided on fair grounds or in a museum, with fair ground or museum site maps being downloaded to the portable device or the mobile telephone following link activation and the seeing up of the connection to a server of the fair or museum organization.

7. Method of ordering location-specific services according to claim 1, wherein, if the method is used on fair grounds and the connection to the server is set up, the user enters a visiting program and, subsequently, information relating to the user's visiting program is downloaded to the portable device or mobile telephone.

8. Method of ordering location-specific services according to claim 1, wherein said information guides the user to the fair stands that the user desires to visit.

9. Method of ordering location-specific services according to claim 1, wherein the location and service-specific RFID or NFC label is affixed to a seat in a stadium or sports arena, with the user, following link activation and the setting up of the connection to a caterer's server, entering a user's order directly or summoning a service assistant of the caterer's.

10. Method of ordering location-specific services according to claim 9, wherein, following the setting up of the connection to the caterer's server and if alcoholic beverages are ordered, determining whether the person placing the order is of sufficient legal age to order alcoholic beverages, said determination being based on data associated with the owner of the ticket identifying the seat to which the RFID or NFC label is affixed.

11. Method of ordering location-specific services according to claim 1, where in the location and service-specific RFID or NFC label is affixed to a seat in a stadium or a sports arena and, following link activation and the setting up of the connection to a server of a betting office, bets relating to the sports event taking place in real time are offered in dependence upon the location information communicated via the link, with the user then enabled to place a desired bet.

12. Method of ordering location-specific services according to claim 11, wherein payment due to the betting office is made via credit card or banking information stored in the portable device or mobile telephone or directly via the mobile telephone's telephone number.

13. Method of ordering location-specific services according to claim 1, wherein the location and service-specific RFID or NFC label is affixed to a table in a restaurant, with the user placing an order directly under menu control or summoning a restaurant assistant following link activation and the setting up of the connection to a restaurant server.

14. Method of ordering location-specific services according to claim 1, wherein the link is activated by means of a connection selected from the group consisting of a mobile telephone network, a wireless local area network (WLAN) and another wireless network.

* * * * *